USO12492925B2

(12) United States Patent
Mattar et al.

(10) Patent No.: US 12,492,925 B2
(45) Date of Patent: Dec. 9, 2025

(54) VORTEX FLOWMETER PROVIDING EXTENDED FLOW RATE MEASUREMENT

(71) Applicant: Schneider Electric Systems USA, Inc., Foxborough, MA (US)

(72) Inventors: Jeffrey Mattar, Foxborough, MA (US); Harry DesRosiers, Attleborough, MA (US)

(73) Assignee: SCHNEIDER ELECTRIC SYSTEMS USA, INC., Foxborough, MA (US)

( * ) Notice: Subject to any disclaimer, the term of this patent is extended or adjusted under 35 U.S.C. 154(b) by 0 days.

(21) Appl. No.: 18/370,233

(22) Filed: Sep. 19, 2023

(65) Prior Publication Data

US 2024/0019285 A1 Jan. 18, 2024

Related U.S. Application Data

(62) Division of application No. 17/179,580, filed on Feb. 19, 2021, now Pat. No. 11,815,377.

(60) Provisional application No. 62/988,773, filed on Mar. 12, 2020.

(51) Int. Cl.
*G01F 1/38* (2006.01)
(52) U.S. Cl.
CPC .................................... *G01F 1/38* (2013.01)
(58) Field of Classification Search
CPC ... G01F 1/20–203; G01F 1/3209–3227; G01F 1/34–363; G01F 1/38; G01F 1/72
See application file for complete search history.

(56) References Cited

U.S. PATENT DOCUMENTS

| 9,157,775 | B2 | 10/2015 | Strom et al. |
| 10,175,083 | B1 | 1/2019 | Lopera et al. |
| 2005/0034535 | A1 | 2/2005 | Sprague |
| 2006/0173607 | A1 | 8/2006 | Matsuo |
| 2009/0326839 | A1* | 12/2009 | Rogers ...................... G01F 1/44 73/861.64 |
| 2011/0083515 | A1 | 4/2011 | Phillips |

(Continued)

FOREIGN PATENT DOCUMENTS

| GB | 2161941 A | 1/1986 |
| IN | 2013-01763 a | 9/2015 |

(Continued)

OTHER PUBLICATIONS

English Translation of JP H10-170320 (Year: 1998).*

(Continued)

*Primary Examiner* — Alexander A Mercado
(74) *Attorney, Agent, or Firm* — Stinson LLP

(57) ABSTRACT

A vortex flowmeter for measuring a flow rate of a fluid. The meter includes a flowtube, a bluff body, and a vortex sensor. The bluff body, which is positioned in the flowtube, sheds vortices in the fluid when the fluid flows through the flowtube and the vortex sensor detects the vortices and generates a vortex signal representing the detected vortices. A pressure sensor arrangement is configured to detect a differential pressure in the fluid between a first location upstream of at least a portion of the bluff body and a second location downstream of at least a portion of the bluff body and generate a differential pressure signal representing the pressure differential between the two locations. The flowmeter determines the fluid flow rate based on the pressure differential.

20 Claims, 3 Drawing Sheets

(56) References Cited

U.S. PATENT DOCUMENTS

2013/0282309 A1* 10/2013 Hollmach ................. G01F 1/86
                                                          702/45
2014/0260658 A1    9/2014  Strom et al.
2018/0274956 A1    9/2018  Miller et al.
2021/0140804 A1    5/2021  Kirst

FOREIGN PATENT DOCUMENTS

JP     10170320 A    6/1998
WO   2009158605 A2  12/2009

OTHER PUBLICATIONS

Extended European Search Report, Application No. 21160390.0, Dated Jul. 13, 2021, 9 pages.
Examination Report from IN Application No. 202114009605, dated Sep. 24, 2025, 7 pages.

* cited by examiner

VORTEX FLOWMETER PROVIDING EXTENDED FLOW RATE MEASUREMENT

CROSS-REFERENCE TO RELATED APPLICATION

This application is a divisional of U.S. patent application Ser. No. 17, 179,580, filed Feb. 19, 2021, which claims priority from U.S. Provisional Patent Application No. 62/988,773, filed Mar. 12, 2020, the entire disclosures of which are incorporated herein by reference.

FIELD

The present disclosure generally relates to a vortex flowmeter for measuring the flow rate of a fluid, and more particularly, the present disclosure pertains to a vortex flowmeter with a sensor configured to detect the differential pressure at locations upstream and downstream of the bluff body.

BACKGROUND

Flowmeters may measure the rate of flow of a fluid in a pipe or other pathway. The fluid may be, for example, a gas or a liquid, and may be compressible or incompressible. One type of flowmeter is a vortex flowmeter, which measures flow rate based on the principle of vortex shedding. Vortex shedding refers to a natural process in which a fluid passing a bluff body (sometimes referred to as a shedder) causes a boundary layer of slowly moving fluid to be formed along the surface of the bluff body. A low pressure area is created behind the bluff body and causes the boundary layer to roll up, which generates vortices in succession on opposite sides of the bluff body. Unfortunately, the principle of operation of a vortex flowmeter requires a minimum Reynolds number based on the velocity, density, and viscosity of the fluid being measured. This means that for a given fluid, a vortex flowmeter has a minimum velocity limit in order to measure flow rates.

SUMMARY

Aspects of the present disclosure recognize that vortices induce pressure variations that may be sensed by a pressure sensor and, under turbulent flow conditions, the vortex-shedding pressure variations have a frequency that is related to the flow rate. Accordingly, by measuring the frequency of the pressure variations, the flow rate may be determined. A vortex flowmeter embodying aspects of the present disclosure measures fluid flow by using the vortex flowmeter's shedder bar as a pressure drop element. A beta ratio (β) calculated for a given shedder geometry can then be used in conjunction with a differential pressure measurement to calculate flow rates, even at relatively low velocities below the conventional limit of vortex shedding.

In an aspect, a vortex flowmeter for measuring a flow rate of a fluid includes a flowtube, a bluff body, and a vortex sensor. The bluff body, which is positioned in the flowtube, sheds vortices in the fluid when the fluid flows through the flowtube and the vortex sensor detects the vortices and generates a vortex signal representing the detected vortices. A pressure sensor arrangement is configured to detect a differential pressure in the fluid between a first location upstream of at least a portion of the bluff body and a second location downstream of at least a portion of the bluff body and generate a differential pressure signal representing the differential pressure.

In another aspect, a vortex flowmeter for measuring a flow rate of a fluid comprises a flowtube and a bluff body positioned in the flowtube. The flowmeter also includes one or more sensors configured to generate signals representing characteristics of the fluid as it flows through the flowtube past the bluff body. A measurement processor generates a flow rate output representing the flow rate of the fluid based on the signals from the one or more sensors when the fluid has a Reynolds number of less than 2000.

In yet another aspect, a method of determining a total quantity of fluid in a batch process comprises detecting vortices shed by a bluff body positioned in a flowtube of a vortex flowmeter as the fluid flows across the bluff body during the batch process and detecting a differential pressure across the bluff body during the batch process. The method further includes determining a first amount of fluid that flows past the bluff body during an initial portion of the batch process based on the detected differential pressure, determining a second amount of fluid that flows past the bluff body during a middle portion of the batch process based on the detected vortices, and determining a third amount of fluid that flows past the bluff body during a final portion of the batch process based on the detected differential pressure.

Other objects and features of the present invention will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
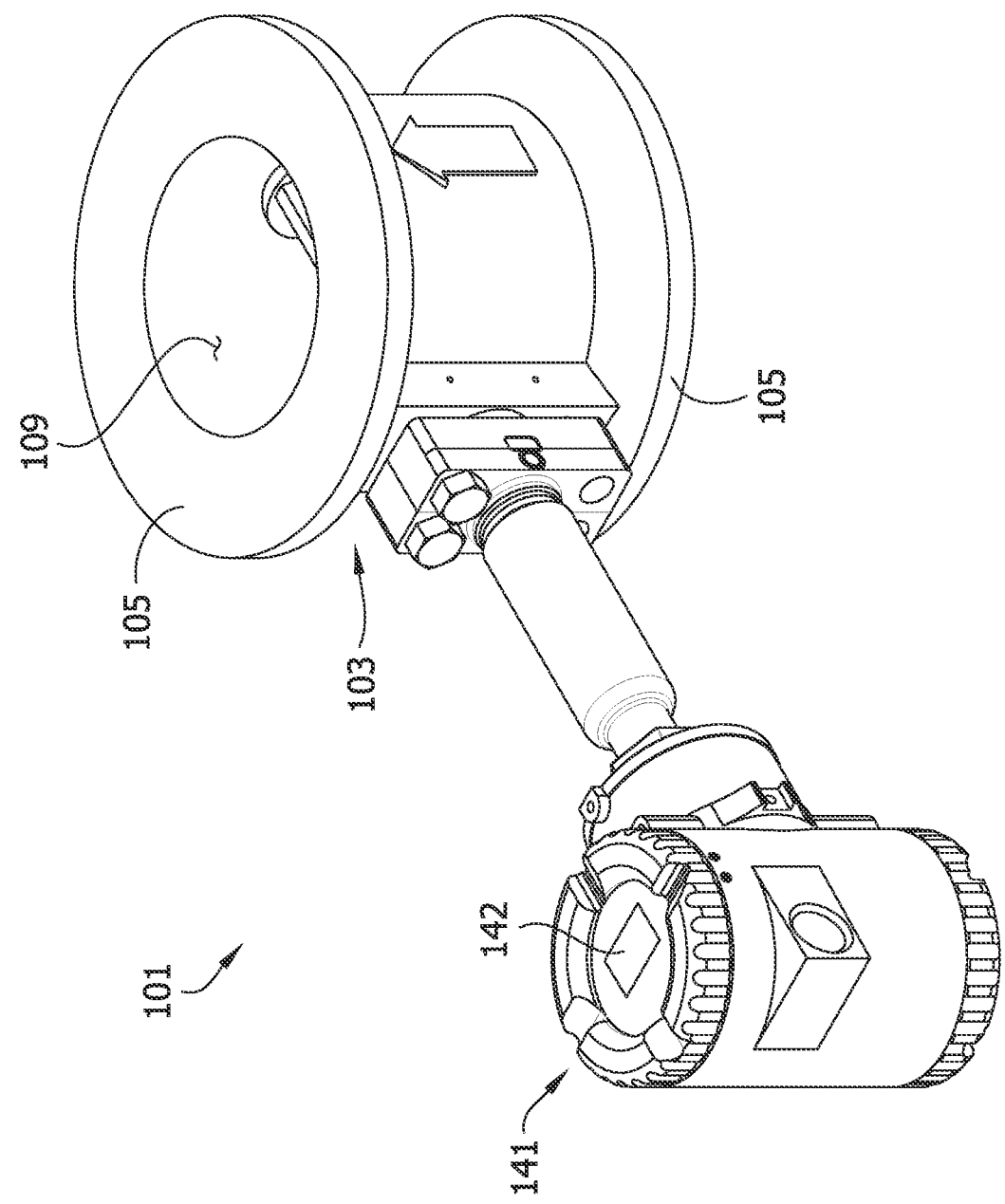
FIG. 1 is a perspective of a vortex flowmeter according to an embodiment.
Figure 2:
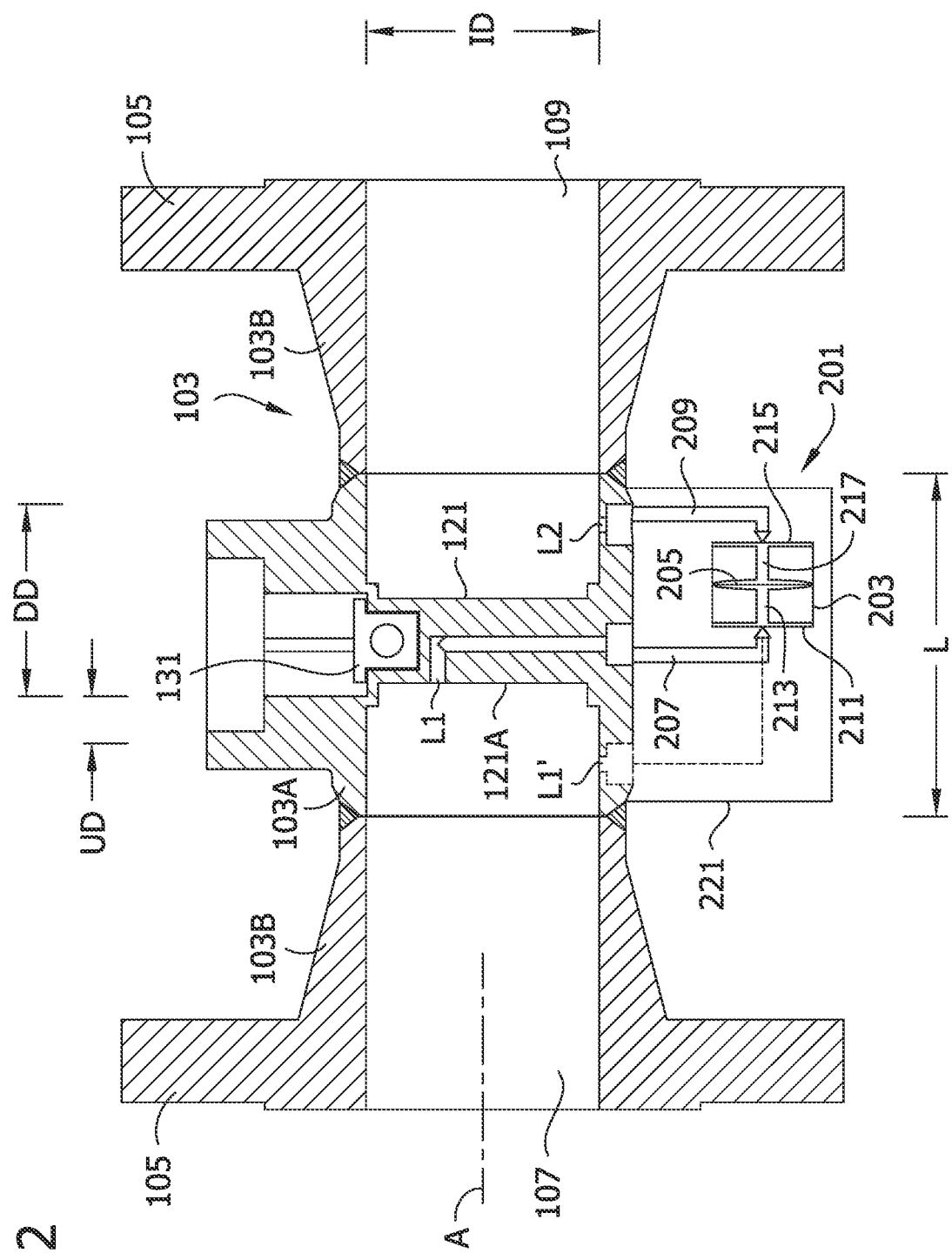
FIG. 2 is a longitudinal cross section of a subassembly of the vortex flowmeter of including a flowtube and a bluff body and schematically illustrating a differential pressure sensor of the vortex flowmeter.

Referring now to FIGS. 1 and 2, one embodiment of a vortex flowmeter for measuring fluid flow rate is generally designated 101. The vortex flowmeter 101 includes a flowtube 103 through which a fluid can flow. The flowtube 103 is suitably configured for installation in a fluid flow line (not shown). For example, the flowtube 103 includes process connections 105 on opposite ends for connecting the inlet 107 (FIG. 2) and outlet 109 of the flowtube to the ends of pipes in a pipeline. In one or more embodiments, the process connections 105 can be adapted for a wafer connection, a flange connection, threaded connections, NPT connections, or any other suitable type of connection. As described in detail below, the vortex flowmeter 101 provides vortex frequency data that can be used in conjunction with flow calibration factors to determine the velocity and volumetric flow rate of the fluid passing through the meter. With inputted fluid density values, the mass flow rate can also be computed. These measurements, and others, can be transmitted to a control room or other receiver over a communication line, such as, for example, a standard two-wire 4-20 milliamp ("mA") transmission line.

As shown in FIG. 2, in the illustrated embodiment the flowtube 103 includes a main tube member 103A formed from a single piece of material and first and second end pieces 103B that are joined (e.g., welded) to the ends of the main tube member. The flowtube 103 has an axis A, and the main tube member 103A has a length L that extends along the axis A of the flowtube. The process connections 105 are integrally formed with the end pieces 103B in the illustrated embodiment. Although the illustrated flowtube 103 has a three-piece construction, other flowtubes can be constructed from any suitable number or arrangement of pieces.

Referring still to FIG. 2, a bluff body 121 (sometimes referred to in the industry as a vortex shedder or shedder bar) is positioned in the flowtube 103. The bluff body 121 is a structure that is positioned in the fluid flow so it extends into the flowtube 103 for the purpose of generating vortices in the fluid when the fluid flows through the flowtube. Those skilled in the art recognize that the size and shape of the bluff body can vary. Broadly speaking, the bluff body can have any configuration as long as it is able to generate vortices in a fluid stream flowing past the bluff body. When the fluid is flowing through the flowtube 103 under turbulent flow conditions, the frequency of the vortices is proportional to the velocity of the fluid. Assuming the cross sectional flow area of the flowtube 103 is constant, the frequency of vortices is also proportional to the volumetric flow rate. Moreover, if the density of the fluid is known or measured, the mass flow rate can be derived from the volumetric flow rate.

As shown in FIG. 2, the vortex flowmeter 101 includes a vortex sensor 131 positioned to detect vortices generated by the bluff body 121. As illustrated, the vortex sensor 131 is suitably positioned at the top of the bluff body 121. In this embodiment, the vortex sensor 131 is in direct contact with fluid flowing through the flowtube 103. This allows the vortex sensor 131 to sense vortices directly. However, it is contemplated that the vortex sensor can be positioned to sense vortices indirectly, such as by detecting movement of the bluff body or other structure that is designed to flex or otherwise move in response to pressure fluctuations associated with the vortices formed in the fluid. In the illustrated embodiment, the vortex sensor 131 is a differential pressure sensor that uses piezoelectric transducers to sense vortices. Suitably, the sensor 131 is mounted in the bluff body 121 so that the sensor is exposed to fluid on both lateral sides of the bluff body. As such, the sensor can detect pressure differences in pressure on opposite lateral sides of the bluff body 121. So as vortices form in alternating fashion on opposing lateral sides of the bluff body, the sensor 131 registers the fluctuation in differential pressure between the lateral sides of the bluff body and generates a generally sinusoidal vortex signal.

As those skilled in the art will appreciate, when the fluid flowing through the flowtube 103 is turbulent (e.g., has a Reynolds number greater than or equal to about 2900) or somewhat turbulent (e.g., has a Reynolds number greater than or equal to about 2300), the vortices will alternate at a frequency that is proportional to the flow rate. Thus, as shown in FIG. 1, the illustrated flowmeter 101 comprises a transmitter 141 that includes a measurement processor 142 (shown schematically) that is operatively connected to the vortex sensor 131 to receive the vortex signal. Generally, the measurement processor 142 is configured to determine the frequency of the vortex signal and use the determined frequency to calculate a flow rate at which the fluid is flowing through the flowtube 103 (e.g., a fluid flow velocity output, a volumetric flow rate output, and/or, a mass flow rate output).

In an embodiment, the transmitter 141, which can be analog or digital, is configured to communicate or output the determined flow rate to a distributed control system (not shown) using protocols such as, but not limited to, 4-20 mA output, HART, Foundation Fieldbus, and Modbus. The measurement processor 142 may include a processor-readable medium storing code representing instructions to cause the processor to perform a process. The processor 142 may be, for example, a commercially available microprocessor, an application-specific integrated circuit (ASIC) or a combination of ASICs, which are designed to achieve one or more specific functions (e.g., determine a flow rate based on one or more sensor signals), or enable one or more specific devices (e.g., the transmitter 141) or applications. In yet another embodiment, measurement processor 142 may be an analog or digital circuit, or a combination of multiple circuits. The measurement processor 142 can also include one or more memory components (not shown) for storing data in a form retrievable by the processor. For example, the memory can store processor-executable software that is executed by the processor 142 to perform a flow rate measurement process.

In one or more embodiments, the measurement processor 142 is configured to execute a flow rate measurement process that activates a low flow cutoff when the frequency of the vortex signal is less than a threshold low flow cutoff frequency. When the fluid flowing through the flowtube 103 is non-turbulent, the frequency of the vortex signal will not relate to the flow rate of the fluid in a predictable fashion, so a low flow cutoff frequency is chosen to be the lower bound at which the flowmeter 101 will output a flow rate measurement based on the vortex signal. For example, in one or more embodiments, the low flow cutoff frequency is chosen to generally correspond to a flow rate of the fluid through the flowtube 103 at which the fluid has a Reynolds number of somewhere roughly between 2000 and 3000. When the frequency of the vortex signal is greater than the low flow cutoff frequency, the measurement processor 142 outputs a flow rate signal based on the vortex signal. But when the frequency of the vortex signal is less than the low flow cutoff frequency, the measurement processor 142 does not output a flow rate signal based on the vortex signal.

The inventors have recognized that the low flow cutoff of a vortex flowmeter can lead to inaccuracies in flow measurement. At a basic level, the flowmeter will fail to register any flow that occurs at a sufficiently low rate to trigger the low flow cutoff. The failure to register low flow rates can be particularly consequential in fluid batch processes in which a flowmeter is used to provide an indication of the totalized flow of fluid in a batch process that begins and ends at zero flow and must ramp up to and ramp down from a flow rate that exceeds the low flow cutoff during the limited duration of the batch. In batch processes, a vortex flowmeter can completely fail to account for the flow during the ramp-up and ramp-down intervals, which during short, low-flow rate batches, can cause substantial inaccuracies in the totalized flow rate measurement.

Referring still to FIG. 2, the illustrated flowmeter 101 further comprises a pressure sensor arrangement 201 (shown schematically) configured to detect a differential pressure in the fluid between a first location L1 upstream of a portion of the bluff body and a second location L2 downstream of at least a portion of the bluff body. The inventors have recognized that, even when the fluid flowing through flowtube 103 is entirely laminar (has a flow rate that will trigger the low flow cutoff), this pressure differential across the bluff body can have a predictable relationship to flow rate. Thus, in one or more embodiments, the pressure sensor arrangement 201 is configured to generate a differential pressure signal representing the pressure differential between the upstream and downstream locations L1, L2 and provide the differential pressure signal to the measurement processor 142. As will be explained in further detail below, the measurement processor 142 is configured to use the differential pressure signal to output a differential pressure signal-based flow rate measurement when the frequency of the vortex signal is less than the low flow cutoff frequency and/or to verify that the vortex sensor 131 is providing an accurate representation of flow rate.

In the illustrated embodiment, the pressure sensor arrangement 201 comprises a single differential pressure sensor unit 203 that is configured to directly measure the differential pressure between the upstream and downstream locations L1, L2, respectively. The differential pressure sensor unit 203 includes a sensing diaphragm 205 having a first side and an opposite second side. First passaging 207 is configured to convey a pressure from the upstream location L1 to the first side of the sensing diaphragm 205, and second passaging 209 is configured to convey a pressure from the downstream location L2 to the second side of the sensing diaphragm. A differential pressure between the upstream and downstream locations L1, L2 thus imparts imbalanced forces on the opposite sides of the sensing diaphragm 205. The sensing diaphragm is configured to deform in response to the imbalanced forces, and a sensing element (e.g., a piezoelectric strain gauge; not shown) is configured to detect the deformation of the sensing diaphragm and thereby produce a signal proportional to the differential pressure.

In the illustrated embodiment, the first passaging 207, which communicates pressure from the upstream location L1 to the first side of the sensing diaphragm 205, comprises a hole formed in the bluff body 121 at the upstream location L1 to form a pressure tap. Additional holes in the bluff body 121 and the flowtube 103, as well as other tubing, together define an open fluid passage that extends from the pressure tap at the upstream location L1 to an isolation diaphragm 211 on a first side of the differential pressure sensor unit 203. The first passaging 207 further comprises an isolation passage 213 that fluidly connects the isolation diaphragm 211 to the first side of sensing diaphragm 205. The process fluid in the flowtube 103 can flow into the open fluid passage through the pressure tap at the upstream location L1, which conveys the pressure at the upstream location L1 to the isolation diaphragm 211. The isolation diaphragm is configured to deform in response to pressure imparted on it by the process fluid. The isolation passage 213 is filled with oil or other pressure-conveying fluid that conveys the pressure to the first side of the sensing diaphragm 205 in response to the deformation of the isolation diaphragm 211.

The second passaging 209, which communicates pressure from the downstream location L2 to the second side of the sensing diaphragm 205, comprises a hole formed in flowtube 103 at the downstream location L2 to form a pressure tap. This hole and additional tubing together define an open fluid passage that extends from the pressure tap at the downstream location L2 to an isolation diaphragm 215 on a second side of the differential pressure sensor unit 203. The second passaging 209 further comprises an isolation passage 217 that fluidly connects the isolation diaphragm 215 to the second side of the sensing diaphragm 205. The process fluid in the flowtube 103 can flow into the open fluid passage through the pressure tap at the downstream location L2, which conveys the pressure at the downstream location to the isolation diaphragm 215. The isolation diaphragm is configured to deform in response to pressure imparted on it by the process fluid. The isolation passage 217 is filled with oil or other pressure-conveying fluid that conveys the pressure to the second side of the sensing diaphragm 205 in response to the deformation of the isolation diaphragm 215.

Although the illustrated embodiment uses open fluid passages formed through the bluff body 121 and flowtube 103 to provide fluid communication between the pressure tap locations L1, L2 and the external isolation diaphragms 211, 215, it is contemplated that the differential pressure sensor unit can have other configurations. For example, in one or more embodiments, the flowmeter includes isolation diaphragms immediately adjacent the upstream and downstream pressure tap locations L1, L2 and the passaging that conveys the pressure from the upstream and downstream pressure tap locations to the sensing diaphragm is essentially entirely filled with pressure-conveying fluid that is isolated from the process fluid.

It will be understood other pressure sensor arrangements besides a single differential pressure sensor unit may be used in one or more embodiments. For example, it is expressly contemplated that the pressure sensor arrangement can comprise a first line pressure sensor that is configured to detect a first line pressure at the upstream pressure tap location, a second line pressure sensor that is configured to detect a second line pressure at the downstream pressure tap location, and a measurement circuit that is configured to determine a difference between the first line pressure and the second line pressure.

It can be seen that the pressure sensor arrangement 201 for detecting a differential pressure across the bluff body 121 has been integrated directly into the vortex flowmeter 101 via pressure taps that are formed integrally with the meter. In one or more embodiments, the pressure taps are each located at respective locations L1, L2 along the length L of the same unitary piece 103A of the flowtube 103. Further, in the illustrated embodiment, the pressure sensor arrangement 201 is permanently mounted on the flowtube 103 in an integrated housing 221. The pressure sensor arrangement 201 cannot be removed from the illustrated flowmeter 101 without exposing the integrated pressure taps to direct fluid communication with the external environment, which effectively renders the flowmeter 101 inoperable.

Moreover, the illustrated flowmeter 101, including both the vortex sensor 131 and the pressure sensor arrangement 201, forms an integrated flow rate measurement instrument that may be installed in a pipe and connected to a distributed control system in unitary fashion. For example, only the two process connections 105 at the ends of the flowtube 103 must be secured to the pipe to simultaneously operatively connect both the vortex sensor 131 and the pressure sensor arrangement 201 to the pipe. Likewise, in one or more embodiments, only one set of hardwire contacts of the transmitter 141 is connected to the distributed control network (or a single-point wireless connection is made between the transmitter 141 and the distributed control network) to enable outputs based on both the vortex sensor 131 and the pressure sensor arrangement 201.

In the illustrated embodiment, the upstream pressure tap location L1 is located on an upstream end face 121A of the bluff body 121 and the downstream pressure tap location L2 is spaced apart from the upstream end face of the bluff body along the longitudinal axis A of the flowtube 103 in a downstream direction by a distance DD. It is also to be understood that, instead of the upstream pressure tap location L1 on the end face 121A of the bluff body 121, an upstream pressure tap location L1' may be used that is spaced apart from the upstream end face of the bluff body by a distance UD. Pressure taps formed in the flowtube wall (e.g., at locations L1', L2) may be located at circumferential regions of the flowtube wall that are in line with the bluff body or that are circumferentially offset from the regions of contact between the bluff body and the flowtube wall. As demonstrated in the examples below, it has been found that a flow-induced differential pressure is detected at either circumferential location.

In general, the differential pressure induced by the process fluid flowing across the bluff body 121 at low flow rates is relatively small. Thus, it may be desirable to locate the upstream and downstream pressure taps at locations where the differential pressure is most pronounced so that changes in differential pressure attributable to changes in flow rate can be more easily and reliably detected using a less sensitive, and thus less expensive, pressure sensing arrangement 201. It is believed that the differential pressure is greatest between an upstream location L1 on the upstream end face 121A of the bluff body 121 and a downstream location L2 that is spaced apart from upstream end face of the bluff body by a particular distance that will vary by application, depending on factors such as the pipe line size, the inner diameter ID of the flowtube 103, the type of process fluid, and the size and shape of the bluff body. In one or more exemplary embodiments, however, the distance DD between the upstream end face 121A of the bluff body 121 and the downstream pressure tap location D2 is in an inclusive range of from about 0.333-times the inner diameter ID of the flowtube to about 5.0-times the inner diameter (e.g., for a flowtube having a diameter from about 0.75 inches to about 5.0 inches).

Although forming the upstream pressure tap at the location L1 on the upstream end face 121A of the bluff body 121 is believed to enable detection of the greatest differential pressures, in some cases it may still be desirable to use the alternative upstream pressure tap location L1'. For example, when the process fluid contains paraffin or lipids, such materials may clog the upstream pressure tap when it is located at the location L1 on the upstream end face 121A. In one or more embodiments, therefore, an upstream pressure tap location L1' is selected that is spaced apart from the upstream end face 121A by the distance UD. In one or more embodiments, the distance UD is in an inclusive range of from about 0.0-times the inner diameter ID of the flowtube to about 4.75-times the inner diameter (e.g., for a flowtube having a diameter from about 0.75 inches to about 5.0 inches).

Figure 3:
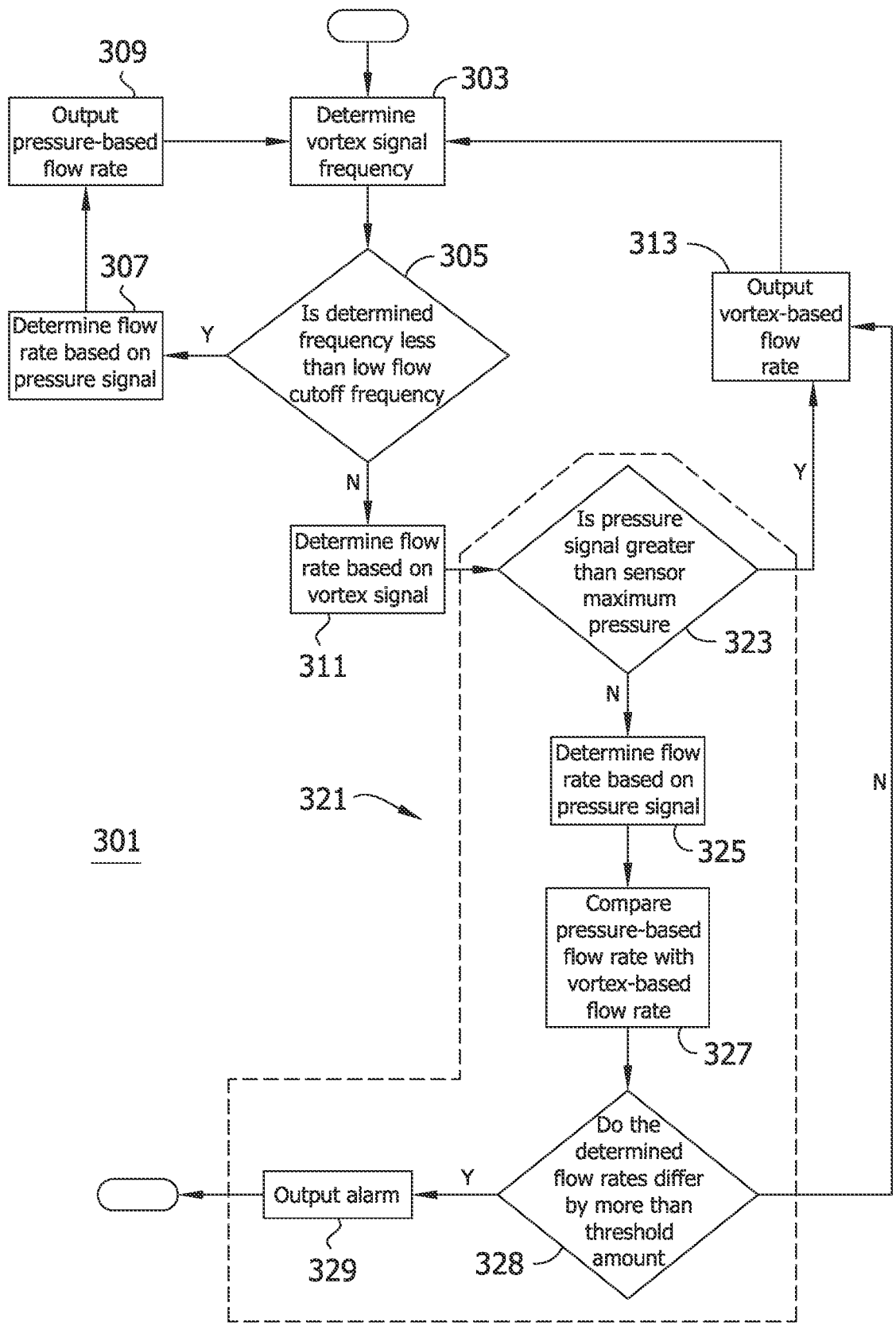
FIG. 3 is a flowchart illustrating an example process of providing a flow rate output using the vortex flowmeter.

Referring now to FIG. 3, exemplary control logic that may be executed by the measurement processor 142 to provide a flow rate output based on the vortex signal from the vortex sensor 131 and the differential pressure signal from the differential pressure sensing arrangement 201 is illustrated schematically at 301. As explained above, during use, the measurement processor 142 is operatively connected to the vortex sensor 131 to receive the vortex signal and the differential pressure sensing arrangement 201 to receive the differential pressure signal. At an initial step 303, the measurement process 142 determines the frequency of the vortex signal for purposes of comparing the determined frequency to the threshold low flow cutoff frequency at 305. If the vortex signal frequency is determined to be less than the low flow cutoff frequency, at step 307, the measurement processor 142 determines the flow rate based on the differential pressure signal from the differential pressure sensor 203. Those skilled in the art understand how to empirically derive mathematical equations for calculating a flow rate based on a differential pressure in a fluid flowing across a flow obstruction. The measurement processor 142 can use any suitable mathematical equation that relates the detected differential pressure to the flow rate in step 307. After determining the flow rate based on the differential pressure signal at 307, the measurement processor 142 outputs a differential pressure signal-based flow rate signal at 309.

Although the illustrated embodiment assesses the vortex signal frequency at 305 to determine when to use the differential pressure signal to generate the flow rate output of the flowmeter 101, other embodiments can use other characteristics of the vortex signal or differential pressure signal to make the same determination. For example, in one embodiment (not shown), the measurement processor determines to use the differential pressure signal to generate the flow rate output when the differential pressure signal has a value that is less than a threshold value that corresponds to a flow rate at which the process fluid is laminar or nearly laminar.

Referring still to FIG. 3, when the vortex signal frequency is determined to be greater than the low flow cutoff frequency at 305, the measurement processor 142 determines the flow rate based on the vortex signal at step 311. The principles of calculating a flow rate (e.g., flow velocity, volumetric flow rate, or mass flow rate) using the frequency of a vortex signal are well-known to those skilled in the art.

In the illustrated embodiment, before outputting the vortex signal-based flow rate measurement at step 313, the measurement processor 142 is configured to execute a verification subroutine 321. Initially, at 323 the measurement processor 142 determines whether the differential pressure detected by the sensor 203 is greater than the maximum pressure threshold of the sensor. If the detected pressure is less than the sensor's maximum pressure threshold, the measurement processor 142 determines the flow rate of the fluid based on the differential pressure signal at 325. After determining the flow rate using both the vortex signal (at 311) and the differential pressure signal (at 325), the measurement processor 142 compares the two flow rate measurements at 327. If at 328 the two flow rate measurements differ by less than a threshold amount, the processor 142 proceeds to output the vortex signal-based flow rate measurement at step 313. However, if the two flow rate measurements differ by greater than the threshold amount, the flowmeter determines that there is an error condition and outputs an alarm at 329. It will be appreciated that the measurement processor 142 can be configured to execute the verification subroutine 321 periodically (e.g., every n-times a vortex signal-based flow rate measurement is determined at 311; after the passage of a predetermined interval of time) or each time a vortex signal-based flow rate measurement is determined.

As can be seen, the illustrated flowmeter 101 extends the measurement range of a conventional vortex flowmeter by providing an integrated differential pressure sensing arrangement 201 for sensing a differential pressure that can be used to determine a flow rate of the process fluid when the shedding frequency is less than the low flow cutoff frequency. Thus, broadly speaking, the vortex flowmeter 101 includes one or more sensors 131, 203 that are each configured to generate a signal representing the characteristics of the fluid as it flows through the flowtube 103 past the bluff body 121 and a measurement processor 142 that is configured to use the signals to provide accurate flow rate measurement outputs across a wide range of flow conditions. For example, in one or more embodiments, the vortex flowmeter is configured to generate a flow rate output representing the flow rate of the fluid based exclusively on the signals from the one or more sensors 131, 203, wherein the flow rate output is produced and is reasonably accurate (e.g., has an error percentage of less than 10%, or less than 5%, or less than 3%, or less than 2%) when the fluid has a Reynolds number of less than or equal to about 2,000, e.g., a Reynolds number of about 1,000, a Reynolds number of about 500, and/or a Reynolds number of about 250.

In one exemplary implementation, the vortex flowmeter 101 is used in a fluid batch process. Fluid batch processes involve discrete batches of fluid that flow from a source to a destination in succession. In an exemplary batch process, the flowmeter 101 is used to determine the total amount of fluid that flows in each batch. Throughout the fluid batch process, the vortex sensor 131 detects the vortices that are shed as process fluid flows across a bluff body 121 and the pressure sensor arrangement 201 detects the differential pressure between the upstream and downstream pressure tap locations L1, L2.

When each batch begins, the flowmeter 101 uses the differential pressure signal from the pressure sensor arrangement 201 to determine the flow rate of the process fluid during an initial ramp-up portion of the batch. The total amount of process fluid flow during the initial ramp-up portion of the process is calculated using the differential pressure signal-based flow rate. The initial ramp-up portion of the batch ends when the frequency of the vortex signal exceeds the low flow cutoff frequency. Following the initial ramp-up portion, during a middle portion of the batch, the flowmeter 101 uses the vortex signal from the vortex sensor 131 to determine the flow rate of the process fluid. The total amount of process fluid flow during the middle portion of the batch is calculated using the vortex signal-based flow rate. In an embodiment, the middle portion of the batch ends when the frequency of the vortex signal falls to less than the low flow cutoff frequency. After the middle portion is complete, during a final ramp-down portion of the batch, the flowmeter 101 uses the differential pressure signal from the pressure sensor arrangement 201 to determine the flow rate of the process fluid. The total amount of process fluid flow during the final ramp-down portion of the process is calculated using the differential pressure signal-based flow rate. Although only three phases of flow rate measurement are mentioned above, it is understood that, in certain embodiments, the middle portion of a batch can be broken up by one or more additional phases of low process fluid flow during which the amount of process fluid flow is determined using the differential pressure signal-based flow rate.

In one embodiment of the batch process described above, the measurement processor 142 locally determines the amount fluid flow during each of the initial ramp-up portion, the middle portion, and the final ramp-down portion based on the determined differential pressure signal-based flow rate and vortex signal-based flow rate, respectively. In another embodiment, the local measurement processor 142 outputs a differential pressure signal-based flow rate and a vortex signal-based flow rate to a remote processor during the respective portions of the batch and the remote processor determines the amount of fluid flow during each portion of the batch. In either case, the total amount of process fluid flow during the batch can be determined using the amounts of fluid flow determined for each of the initial ramp-up portion, the middle portion, and the final ramp-down portion based on the differential pressure signal-based flow rate and the vortex signal-based flow rate, respectively.

EXAMPLE 1

To test the concept of using the differential pressure across a bluff body to provide flow rate measurements, pressure taps were formed in two-inch and four-inch diameter flowtubes 103 at two upstream locations L1, L1' and several downstream locations L2, respectively. During one set of tests, the results of which are described in Table 1, below, a differential pressure sensor was operatively connected to the two-inch diameter flowtube 103 at an upstream pressure tap location L1' spaced apart from the upstream end face 121A of the bluff body 121 by a distance UD of about 0.59 inches and a downstream pressure tap location L2 spaced apart from the upstream end face 121A of the bluff body 121 by a distance DD of about 1.24 inches. The upstream tap location L1' and the downstream tap location L2 in the tests described in Table 1 were located at a circumferential region of the flowtube wall roughly perpendicular to a radial axis of the bluff body.

During another set of tests, the results of which are described in Table 2, below, a differential pressure sensor was operatively connected to the two-inch diameter flowtube 103 at an upstream pressure tap location L1 on the upstream end face 121A of the bluff body 121 and a downstream pressure tap location L2 spaced apart from the upstream end face 121A of the bluff body 121 by a distance DD of about 1.24 inches. The downstream tap location L2 in the tests described in Table 2 was located at a circumferential region of the flowtube wall roughly perpendicular to a radial axis of the bluff body.

The results of another set of tests are described in Table 3, below, in which a differential pressure sensor was operatively connected to the four-inch diameter flowtube 103 at an upstream pressure tap location L1' spaced apart from the upstream end face 121A of the bluff body 121 by a distance UD of about 0.60 inches and a downstream pressure tap location L2 spaced apart from the upstream end face 121A of the bluff body 121 by a distance DD of about 1.88 inches. The upstream tap location L1' and the downstream tap location L2 in the tests described in Table 3 were located at a circumferential region of the flowtube wall roughly perpendicular to a radial axis of the bluff body.

During another set of tests, the results of which are described in Table 4, below, a differential pressure sensor was operatively connected to the four-inch diameter flowtube 103 at an upstream pressure tap location L1 on the upstream end face 121A of the bluff body 121 and a downstream pressure tap location L2 spaced apart from the upstream end face 121A of the bluff body 121 by a distance DD of about 1.88 inches. The downstream tap location L2 in the tests described in Table 4 was located at a circumferential region of the flowtube wall in line with the bluff body.

Table 5, below, describes the results of another set of tests in which a differential pressure sensor was operatively connected to the four-inch diameter flowtube at an upstream pressure tap location L1' spaced apart from the upstream end face 121A of the bluff body 121 by a distance UD of about 0.60 inches and a downstream pressure tap location L2 spaced apart from the upstream end face 121A of the bluff body 121 by a distance DD of about 1.88 inches. The upstream tap location L1' and the downstream tap location L2 in the tests described in Table 5 were located at a circumferential region of the flowtube wall in line with the bluff body.

During each test, a quantity of water was directed through the flow meter to a calibration tank. The rate at which the calibration take was filled was monitored to provide a precise control measurement of the flow rate. For each test, the tables below show the weight of water that was imparted through the flowmeter, the duration of time during which the water was delivered through the flowmeter, the median frequency of the vortex signal generated by the vortex sensor, a detected line pressure at the upstream pressure tap location, a measured line temperature, control flow rate measurements (volumetric flow rate and flow velocity) determined using the control tank, a detected differential pressure between the two pressure tap locations, and calculated values for K and coefficient of discharge based on Equations 1 and 2, below.

TABLE 1

2-Inch Flowtube; Perpendicular Pressure Taps at L1', L2

| Test | 1 | 2 | 3 | 4 | 5 | 6 | 7 | 8 |
|---|---|---|---|---|---|---|---|---|
| Total flow weight (lb) | 2517 | 3509.7 | 2615.6 | 2586 | 3189 | 203.834 | 188.984 | 149.172 |
| Total flow time (sec) | 115.261 | 227.304 | 241.264 | 328.317 | 563.855 | 135.656 | 192.385 | 345.704 |
| Vortex freq (Hz) | 91.6 | 64.9 | 45.7 | 33.2 | 23.9 | 13.9 | 9.1 | 4.1 |
| Up-stream line press. (psig) | 12.759 | 19.169 | 22.407 | 23.914 | 24.751 | 25.355 | 25.548 | 25.674 |
| Line temp. (F.) | 74.1 | 74.2 | 74.4 | 74.8 | 75.2 | 75.4 | 75.6 | 75.7 |
| Contr. vol. flow rate (GPM) | 157.7 | 111.5 | 78.3 | 56.9 | 40.8 | 23.9 | 15.7 | 6.9 |
| Contr. flow vel. (ft/sec) | 17.2 | 12.1 | 8.5 | 6.2 | 4.4 | 2.6 | 1.7 | 0.75 |
| DP (psi) | 4.0 | 2.0 | 1.0 | 0.52 | 0.27 | 0.093 | 0.040 | 0.008 |
| K | 8.61 | 8.61 | 8.61 | 8.59 | 8.60 | 8.57 | 8.50 | 8.36 |
| CoD | 0.868 | 0.867 | 0.867 | 0.866 | 0.866 | 0.863 | 0.856 | 0.842 |

TABLE 2

2-Inch Flowtube; Pressure Taps at L1, Perpendicular L2

| Test | 1 | 2 | 3 | 4 | 5 | 6 | 7 | 8 |
|---|---|---|---|---|---|---|---|---|
| Total flow weight (lb) | 2523.6 | 2660 | 2735.8 | 2558 | 1612.7 | 1568.9 | 152.414 | 152.063 |
| Total flow time (sec) | 116.351 | 128.524 | 166.392 | 213.936 | 200.403 | 270.599 | 80.821 | 89.691 |
| Vortex freq (Hz) | 91.1 | 86.9 | 69.2 | 50.4 | 33.9 | 24.5 | 17.5 | 15.7 |
| Up-stream line press. (psig) | 15.822 | 16.664 | 19.994 | 22.599 | 24.245 | 24.917 | 25.309 | 25.386 |
| Line temp. (F.) | 68.8 | 69.2 | 69.5 | 69.8 | 70.2 | 70.4 | 68.5 | 68.8 |
| Contr. vol. flow rate (GPM) | 156.5 | 149.3 | 118.7 | 86.3 | 58.1 | 41.8 | 30.0 | 27.0 |
| Contr. flow vel. (ft/sec) | 17.0 | 16.3 | 12.9 | 9.4 | 6.3 | 4.6 | 3.3 | 2.9 |
| DP (psi) | 6.8 | 6.2 | 3.9 | 2.1 | 0.95 | 0.49 | 0.26 | 0.20 |
| K | 6.52 | 6.54 | 6.53 | 6.52 | 6.50 | 6.51 | 6.45 | 6.49 |
| CoD | 0.657 | 0.659 | 0.658 | 0.658 | 0.655 | 0.656 | 0.650 | 0.654 |

| Test | 9 | 10 | 11 | 12 | 13 |
|---|---|---|---|---|---|
| Total flow weight (lb) | 201.306 | 155.31 | 151.178 | 151.102 | 132.864 |
| Total flow time (sec) | 139.78 | 132.236 | 180.331 | 318.36 | 517.667 |
| Vortex freq (Hz) | 13.3 | 10.9 | 7.8 | 4.5 | 2.5 |
| Up-stream line press. (psig) | 25.477 | 25.56 | 25.65 | 25.707 | 25.723 |
| Line temp. (F.) | 69.1 | 69.4 | 69.6 | 69.9 | 70 |
| Contr. vol. flow rate (GPM) | 22.9 | 18.7 | 13.3 | 7.6 | 4.1 |
| Contr. flow vel. (ft/sec) | 2.5 | 2.0 | 1.5 | 0.82 | 0.44 |
| DP (psi) | 0.15 | 0.10 | 0.052 | 0.017 | 0.005 |
| K | 6.45 | 6.43 | 6.36 | 6.34 | 6.25 |
| $C_d$ | 0.650 | 0.648 | 0.641 | 0.639 | 0.630 |

TABLE 3

4-Inch Flowtube; Perpendicular Pressure Taps at L1', L2

| Test | 1 | 2 | 3 | 4 | 5 | 6 | 7 | 8 | 9 |
|---|---|---|---|---|---|---|---|---|---|
| Total flow weight (lb) | 4532.7 | 4545.4 | 4514.9 | 4575.5 | 3581.7 | 2570.6 | 2609.0 | 2588.4 | 2818.0 |
| Total flow time (sec) | 57.6 | 75.3 | 104.5 | 148.6 | 187.3 | 205.4 | 278.2 | 437.1 | 680.0 |
| Vortex freq (Hz) | 43.19 | 33.17 | 23.75 | 16.95 | 10.54 | 6.90 | 5.16 | 3.25 | 2.27 |
| Upstream line press. (psig) | 14.3 | 18.9 | 22.2 | 23.9 | 25.0 | 25.4 | 25.5 | 25.6 | 25.7 |
| Line temp. (F.) | 76.8 | 74.5 | 74.6 | 74.7 | 76.3 | 76.2 | 76.4 | 76.6 | 76.8 |
| Contr. vol. flow rate (GPM) | 568.0 | 435.6 | 312.0 | 222.3 | 138.1 | 90.4 | 67.7 | 42.8 | 29.9 |
| Contr. flow vel. (ft/sec) | 15.85 | 12.16 | 8.71 | 6.20 | 3.85 | 2.52 | 1.89 | 1.19 | 0.84 |
| DP (psi) | 3.44 | 2.02 | 1.03 | 0.53 | 0.20 | 0.0870 | 0.0493 | 0.0190 | 0.0050 |
| K | 8.541 | 8.561 | 8.566 | 8.556 | 8.573 | 8.551 | 8.515 | 8.669 | 11.836 |
| CoD | 0.860 | 0.862 | 0.863 | 0.862 | 0.864 | 0.861 | 0.858 | 0.873 | 1.192 |

| Test | 10 | 11 | 12 | 13 | 14 | 15 | 16 | 17 | 18 |
|---|---|---|---|---|---|---|---|---|---|
| Total flow weight (lb) | 2669.0 | 3650.7 | 2516.2 | 3122.0 | 2605.2 | 2631.4 | 2600.0 | 2668.8 | 2608.0 |
| Total flow time (sec) | 673.6 | 560.3 | 644.3 | 822.0 | 686.3 | 648.8 | 688.1 | 703.0 | 686.9 |
| Vortex freq (Hz) | 2.17 | 3.57 | 2.22 | 2.07 | 2.07 | 2.22 | 0.34 | 2.07 | 2.07 |
| Upstream line press. (psig) | 25.6 | 25.6 | 25.7 | 25.7 | 25.7 | 25.7 | 25.7 | 25.7 | 25.7 |
| Line temp. (F.) | 77.3 | 78.3 | 79.0 | 78.0 | 78.0 | 79.0 | 75.0 | 78.3 | 78.4 |
| Contr. vol. flow rate (GPM) | 28.6 | 47.1 | 28.2 | 27.4 | 27.4 | 29.3 | 27.3 | 27.4 | 27.4 |
| Contr. flow vel. (ft/sec) | 0.80 | 1.31 | 0.79 | 0.77 | 0.77 | 0.82 | 0.76 | 0.77 | 0.77 |
| DP (psi) | 0.0089 | 0.0240 | 0.0083 | 0.0080 | 0.0082 | 0.0090 | 0.0076 | 0.0079 | 0.0078 |
| K | 8.467 | 8.481 | 8.654 | 8.560 | 8.431 | 8.645 | 8.763 | 8.623 | 8.646 |
| CoD | 0.853 | 0.854 | 0.872 | 0.862 | 0.849 | 0.871 | 0.883 | 0.868 | 0.871 |

TABLE 4

4-Inch Flowtube; Pressure Taps at L1, Inline L2

| Test | 1 | 2 | 3 | 4 | 5 | 6 | 7 | 8 | 9 |
|---|---|---|---|---|---|---|---|---|---|
| Total flow weight (lb) | 5527.0 | 5520.6 | 4515.7 | 3509.8 | 3516.8 | 3550.8 | 2516.8 | 3520.8 | 2501.6 |
| Total flow time (sec) | 80.4 | 98.8 | 118.2 | 129.3 | 187.8 | 298.8 | 319.0 | 646.4 | 718.4 |

TABLE 4-continued

4-Inch Flowtube; Pressure Taps at L1, Inline L2

| Test | 1 | 2 | 3 | 4 | 5 | 6 | 7 | 8 | 9 |
|---|---|---|---|---|---|---|---|---|---|
| Vortex freq (Hz) | 37.82 | 30.76 | 21.02 | 14.95 | 10.32 | 6.55 | 4.35 | 2.98 | 1.90 |
| Up-stream line press. (psig) | 19.42 | 21.51 | 23.69 | 24.66 | 25.19 | 25.50 | 25.61 | 25.67 | 25.69 |
| Line temp. (F.) | 76.9 | 76.0 | 77.0 | 75.6 | 75.6 | 75.7 | 76.0 | 76.2 | 76.4 |
| Contr. vol. flow rate (GPM) | 496.80 | 403.66 | 276.06 | 196.09 | 135.23 | 85.83 | 56.99 | 39.34 | 25.15 |
| Contr. flow vel. (ft/sec) | 1.107 | 0.899 | 0.615 | 0.437 | 0.301 | 0.191 | 0.127 | 0.088 | 0.056 |
| DP (psi) | 7.082 | 4.724 | 2.208 | 1.123 | 0.534 | 0.217 | 0.0978 | 0.0455 | 0.0170 |
| K | 5.21 | 5.18 | 5.18 | 5.16 | 5.16 | 5.14 | 5.09 | 5.15 | 5.39 |
| CoD | 0.525 | 0.522 | 0.522 | 0.520 | 0.520 | 0.518 | 0.512 | 0.519 | 0.543 |

TABLE 5

4-Inch Flowtube; Inline Pressure Taps at L1', L2

| Test | 1 | 2 | 3 | 4 | 5 | 6 | 7 | 8 | 9 | 10 | 11 |
|---|---|---|---|---|---|---|---|---|---|---|---|
| Total flow weight (lb) | 5520.8 | 5536 | 4563.5 | 3529.2 | 3523.6 | 3512 | 3507.8 | 2512.6 | 3762 | 2582.8 | 2568.6 |
| Total flow time (sec) | 74.2 | 88.2 | 102.3 | 115.3 | 163.9 | 225.5 | 350.3 | 307.1 | 631.8 | 593.5 | 970.0 |
| Vortex freq (Hz) | 40.88 | 34.50 | 24.55 | 16.83 | 11.84 | 8.59 | 5.52 | 4.50 | 3.27 | 2.38 | 1.45 |
| Up-stream line press. (psig) | 17.08 | 19.50 | 22.50 | 24.16 | 24.91 | 25.29 | 25.52 | 25.57 | 25.63 | 25.66 | 25.69 |
| Line temp. (F.) | 74.4 | 74.6 | 74.8 | 75.9 | 76.2 | 76.2 | 76.3 | 75.5 | 75.6 | 75.6 | 75.6 |
| Contr. vol. flow rate (GPM) | 537.32 | 453.35 | 322.18 | 221.13 | 155.28 | 112.47 | 72.33 | 59.09 | 43.01 | 31.43 | 19.12 |
| Contr. flow vel. (ft/sec) | 14.99 | 12.65 | 8.99 | 6.17 | 4.33 | 3.14 | 2.02 | 1.65 | 1.20 | 0.88 | 0.53 |
| DP (psi) | 7.07 | 5.02 | 2.54 | 1.20 | 0.605 | 0.313 | 0.128 | 0.0868 | 0.0459 | 0.0228 | 0.0082 |
| K | 5.64 | 5.65 | 5.64 | 5.64 | 5.57 | 5.61 | 5.64 | 5.60 | 5.60 | 5.81 | 5.89 |
| CoD | 0.540 | 0.540 | 0.540 | 0.540 | 0.533 | 0.536 | 0.539 | 0.536 | 0.536 | 0.556 | 0.564 |

$$K = \frac{V}{\sqrt{DP}} \quad \text{Equation 1}$$

Wherein:
V=flow velocity measured using control tank;
DP=measured differential pressure between pressure taps $$C_d = \frac{A1}{A2} * V * \frac{\sqrt{(1-\beta^4)}}{\sqrt{2*gc*\rho*DP}} \quad \text{Equation 2}$$

Wherein:
A1=cross sectional area of pipe;
A2=cross sectional area of throat;

$$\beta = \text{Beta Ratio} \left( \sqrt{\frac{A2}{A1}} \right);$$

gc=gravitational constant;
p=density of fluid

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A vortex flowmeter for measuring a flow rate of a fluid, the vortex flowmeter comprising:
    a flowtube;
    a bluff body positioned in the flowtube;
    a plurality of sensors, each sensor being configured to generate a signal representing one or more characteristics of the fluid as it flows through the flowtube past the bluff body, wherein at least one of the sensors is located on a portion of the bluff body, and wherein at least another one of the sensors is located downstream of the portion of the bluff body on which the at least one of the sensors is located; and a measurement processor configured to generate a first flow rate output representing the flow rate of the fluid based on at least one of the signals from the plurality of sensors when the fluid has a Reynolds number of less than approximately 2300 and a second flow rate output representing the flow rate of the fluid based on at least one other of the signals from the plurality of sensors when the fluid has a Reynolds number of greater than approximately 2300;

wherein the measurement processor is further configured to compare the first and second flow rate outputs.

2. The vortex flowmeter of claim 1, wherein the bluff body positioned in the flowtube is configured for shedding vortices in the fluid when the fluid flows through the flowtube, wherein the sensors comprise a vortex sensor configured to detect the vortices and generate a vortex signal representing the detected vortices, and wherein the measurement processor is configured to generate the second flow rate output using the vortex signal when the fluid has a Reynolds number of greater than approximately 2300.

3. The vortex flowmeter of claim 2, wherein the sensors comprises a pressure sensor arrangement configured to detect a differential pressure in the fluid between a first location upstream of at least a portion of the bluff body and a second location downstream of at least a portion of the bluff body and generate differential pressure signal representing the differential pressure in the fluid between the first location and the second location, and wherein the measurement processor is configured to generate the first flow rate output using the differential pressure signal when the fluid has a Reynolds number of less than approximately 2300.

4. The vortex flowmeter of claim 3, wherein measurement processor is connected to the vortex sensor and the pressure sensor arrangement to receive the vortex signal and the differential pressure signal, respectively, wherein the second flow rate output comprises a vortex signal-based measurement of the flow rate using the vortex signal and the first flow rate output comprises a pressure signal-based measurement of the flow rate using the differential pressure signal.

5. The vortex flowmeter as set forth in claim 4, wherein the measurement processor is further configured to compare a characteristic of at least one of the vortex signal and the differential pressure signal to a threshold and selectively use the vortex signal to generate a flow rate signal when the determined characteristic is greater than the threshold and use the differential pressure signal to generate the flow rate signal when the determined characteristic is less than the threshold.

6. The vortex flowmeter as set forth in claim 5, wherein the determined characteristic is a frequency of the vortex signal and the threshold is a cutoff frequency of the vortex flowmeter representing a lower bound at which the measurement processor generates the flow rate output using the vortex signal.

7. The vortex flowmeter as set forth in claim 3, wherein the bluff body has an upstream end face, and wherein the flowtube has a longitudinal axis and defines a cross sectional flow area through which the fluid flows, the cross sectional flow area being substantially uniform along the longitudinal axis.

8. The vortex flowmeter as set forth in claim 7, wherein the first location is on the upstream end face.

9. The vortex flowmeter as set forth in claim 7, wherein the first location is spaced apart upstream of the upstream end face along the longitudinal axis by a distance in an inclusive range of from about 0.0 times the inner diameter to about 4.75 times the inner diameter.

10. The vortex flowmeter as set forth in claim 7, wherein the second location is spaced apart downstream of the upstream end face along the longitudinal axis by a distance in an inclusive range of from about 0.333 times the inner diameter to about 5.0 times the inner diameter.

11. The vortex flowmeter as set forth in claim 3, wherein the pressure sensor arrangement comprises a differential pressure sensor unit including a sensing diaphragm having a first side and an opposite second side.

12. The vortex flowmeter as set forth in claim 11, further comprising first passaging configured to convey pressure from the first location to the first side of the sensing diaphragm and second passaging configured to convey pressure from the second location to the second side of the sensing diaphragm.

13. The vortex flowmeter as set forth in claim 12, wherein the first passaging comprises a hole formed in at least one of the flowtube and the bluff body and the second passaging comprises a hole formed in the flowtube.

14. The vortex flowmeter as set forth in claim 3, wherein the flowtube comprises a single piece of material having a length, each of the first and second locations being located along the length.

15. The vortex flowmeter as set forth in claim 1, wherein the measurement processor is further configured to provide an alarm when the second flow rate output deviates from the first flow rate output by more than a predetermined amount.

16. A method of determining a total quantity of fluid in a batch process, the method comprising:

detecting vortices shed by a bluff body positioned in a flowtube of a vortex flowmeter as the fluid flows across the bluff body during the batch process using at least one sensor located on a portion the bluff body;

detecting a differential pressure across the bluff body during the batch process using at least another sensor located downstream of the portion of the bluff body on which the at least one sensor is located;

determining a first amount of fluid that flows past the bluff body during an initial portion of the batch process based on the detected differential pressure;

determining a second amount of fluid that flows past the bluff body during a middle portion of the batch process based on the detected vortices;

determining a third amount of fluid that flows past the bluff body during a final portion of the batch process based on the detected differential pressure; and determining the total quantity of fluid by combining the first amount of fluid, the second amount of fluid, and the third amount of fluid.

17. The method as set forth in claim 16, wherein detecting the differential pressure comprises detecting the differential pressure in the fluid between a first location upstream of the bluff body and a second location downstream of the bluff body.

18. The method as set forth in claim 16, further comprising defining the middle portion of the batch process as occurring when the fluid has a Reynolds number greater than approximately 2000.

19. The method as set forth in claim 16, further comprising defining the initial portion of the batch process as occurring when the fluid has a Reynolds number less than approximately 2300.

20. The method as set forth in claim 16, further comprising defining the final portion of the batch process as occurring when the fluid has a Reynolds number less than approximately 2000.

* * * * *